United States Patent
Capps

(10) Patent No.: US 7,298,555 B2
(45) Date of Patent: Nov. 20, 2007

(54) OPTICAL BEAM STEERING USING SMALL ANGLE BEAM STEERING DEVICE

(75) Inventor: C. David Capps, Seattle, WA (US)

(73) Assignee: The Boeing Company, Chicago, IL (US)

( * ) Notice: Subject to any disclaimer, the term of this patent is extended or adjusted under 35 U.S.C. 154(b) by 759 days.

(21) Appl. No.: 10/021,185

(22) Filed: Dec. 7, 2001

(65) Prior Publication Data

US 2003/0107793 A1    Jun. 12, 2003

(51) Int. Cl.
*G02B 27/10* (2006.01)
*G02B 26/08* (2006.01)
*G02F 1/29* (2006.01)

(52) U.S. Cl. .................. 359/618; 359/298; 359/320

(58) Field of Classification Search ........ 359/298–300, 359/305, 315, 320, 196, 197, 618; 398/212, 398/214; 349/201, 202; 385/37
See application file for complete search history.

(56) References Cited

U.S. PATENT DOCUMENTS 5,151,814 A * 9/1992 Grinberg et al. ............ 359/209

6,671,428 B1 * 12/2003 Yang et al. .................... 385/37
6,766,085 B2 * 7/2004 Fouquet et al. ............... 385/52
2002/0105699 A1 * 8/2002 Miracky et al. ............ 359/315
2002/0122619 A1 * 9/2002 Sandler et al. ................ 385/17

OTHER PUBLICATIONS

Paul F. McManamon, et al., *Optical Phased Array Technology*, vol. 84, No. 2, Feb. 1996, pp. 268-298.

* cited by examiner

*Primary Examiner*—Alicia M Harrington
(74) *Attorney, Agent, or Firm*—Norman E. Carte; MacPherson Kwok Chen & Heid LLP

(57) ABSTRACT

In one aspect the system serves as a transmitter and comprises an optics system; a plurality of source elements positioned on the focal plane; and, a small angle beam steerer. The plurality of source elements are each capable of providing a point source of radiation to the optics system. The optics system provides a collimated output. The small angle beam steerer receives the collimated output and redirects the collimated output through a small angular deviation. The redirected output is thus transmitted in a desired direction without a need for mechanical gimbals and is capable of covering a large angular range with respect to the optical axis of the optics system. The system can also be implemented as a receiver.

15 Claims, 2 Drawing Sheets

OPTICAL BEAM STEERING USING SMALL ANGLE BEAM STEERING DEVICE

STATEMENT OF GOVERNMENT INTEREST

This invention was reduced to practice with Government support under Contract No. AAH01-01-C-0026 awarded by Defense Advanced Products Research Agency (DARPA). The Government has certain rights in this invention.

BACKGROUND OF THE INVENTION

1. Field of the Invention

The present invention relates to the steering of optical beams and more particularly to the steering thereof without the need for mechanical gimbals.

2. Description of the Related Art

Present methods for steering optical beams in laser radar of laser communication systems utilize mechanical gimbals to point a telescope assembly or a mirror in the appropriate direction for beam transmission or reception. Recent developments in liquid crystal optical phase shifting devices enable electronic steering of coherent optical beams. However, these devices permit steering only over small angles (approximately four degrees, one dimension) with efficiencies exceeding 50 percent. Since coverage angles in excess of 90 degrees in two dimensions are typically needed for laser communication and laser radar systems, these devices alone are insufficient in themselves to build a complex system without gimbals.

The article entitled Optical Phased Array Technology, Proceedings of the IEEE. VOL. 84, NO. 2, February 1996, pages 268-298, discloses an optical phased array beam steerer suitable for small angle beam steering. Section II, Overview of Liquid Crystal Optical Phased Array Concepts, shows that with current liquid crystal materials high efficiencies can only be achieved for small steering angles. As a specific example, a phased array with center-to-center spacing of 2 μm, a liquid crystal layer thickness of 5 μm, and operating at a wavelength of 1.55 μm will have an efficiency greater than 50% only for steering angles less than 5 degrees, based on the equations presented in this reference.

SUMMARY

The present invention is an optical beam steering system for steering an optical beam. In one broad aspect, the system serves as a transmitter and comprises an optics system; a plurality of source elements positioned on the focal plane; and, a small angle beam steerer. The plurality of source elements are each capable of providing a point source of radiation to the optics system. The optics system provides a collimated output. The small angle beam steerer receives the collimated output and redirects the collimated output through a small angular deviation. The redirected output is thus transmitted in a desired direction without a need for mechanical gimbals and is capable of covering a large angular range with respect to the optical axis of the optics system.

In another broad aspect the optical beam steering system serves as a receiver. In this aspect the optical beam steering system includes a small angle beam steerer; an optics system; and, a plurality of detector elements. The small angle beam steerer receives a collimated laser beam and redirects the collimated laser beam through a small angular deviation. The optics system has a focal plane and an optical axis. The redirected laser beam is focused onto the focal plane. The detector elements are positioned on the focal plane. Each detector element is capable of receiving the focused laser beam from a desired direction without a need for mechanical gimbals, the desired direction capable of covering a large angular range with respect to the optical axis.

Obviating the need for mechanical gimbals provides substantial cost savings. Precision mechanical gimbals are costly to fabricate and bulky to package. Embodiments of the present invention may allow for utilization of automated techniques developed in the electronics industry for packaging sources and detectors on electronics boards. These techniques enable fabrication of the invention at a much lower cost than of a precision mechanical system.

DETAILED DESCRIPTION OF THE INVENTION

Figure 1:
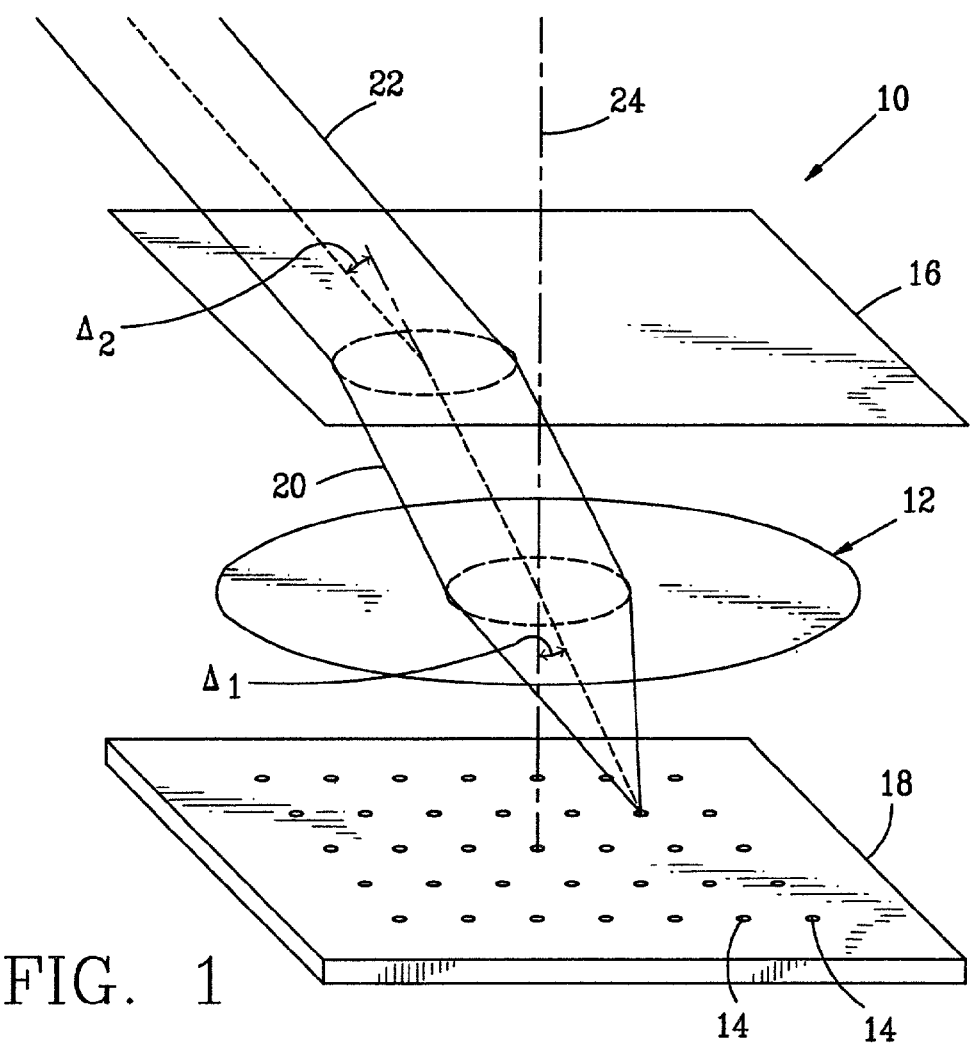
FIG. 1 is a schematic view of a preferred embodiment of the optical beam steering system of the present invention.

Referring to the drawings and the characters of reference marked thereon FIG. 1 illustrates a preferred embodiment of the present invention, designated generally as 10. The optical beam steering system 10 includes an optics system 12, a plurality of source elements 14 and a small angle beam steerer 16. The source elements 14 are positioned on a focal plane 18 of the optics system 12.

The optics system 12 may comprise a wide angle lens such as a conventional 20 mm focal length wide angle lens as used in 35 mm photography or less conventional designs such as used in hemispherical projection systems. Alternatively, reflective optics may be used.

The small angle beam steerer 16 may be an optical phased array such as a transmission mode optical phased array beam steerer formed of a 1-D array of equi-spaced liquid crystal phase shifters. An example of such an optical phased array is described in the article entitled Optical Phased Array Technology, Proceedings of the IEEE. VOL. 84, NO. 2, February 1996, page 274. The inner surface of one transparent substrate is photo-lithographically patterned with transparent, conducting, striped electrodes having the desired spacing for the phase shifters in the array. The active aperture of the array is so patterned. The inside of another substrate is coated with a uniform, transparent, conducting ground plane. Both substrates have inner surfaces prepared to effect quiescent liquid crystal alignment. Application of a voltage between any given striped electrode and the underlying ground plane creates a 1-D phase shifter in the liquid crystal volume underlying the patterned electrode. The optical phased array has an efficiency that depends on the number of phase levels available and the thickness of the liquid crystal. For current liquid crystal materials and a wavelength of 1550 nm, an efficiency of 0.7 may be achieved with a steering angle of approximately three degrees in one dimension.

Other small angle beam steerers 16 may be, for example, acousto-optic devices or electro optic crystal devices. Commercial 2-D acousto-optic beam steering devices are available with apertures in the 5 to 7 mm range and steering angles of approximately three degrees. Electro-optic steering devices consisting of, for example, a lithium niobate crystal with a quadrapole electrode configuration may be used. While these devices have similar aperture and beam steering range, their large size and high voltage requirements make them less suitable than the optical phased array or acousto-optic devices.

As herein, the term "small" angle beam steerer refers to steering in a range of between about 0-5 degrees.

In a first broad aspect, the optical beam steering system 10 operates as a transmitter. The source elements 14 are positioned on the focal plane 18 and are each capable of providing a point source of radiation to the optics system 12. The optics system 12 provides a collimated output 20. This collimated output of the optics system 12 may have a relatively large angular deviation, $\Delta_1$. The small angle beam steerer 16 receives the collimated output 20 and redirects the collimated output through a small angular deviation, $\Delta_2$. The redirected output 22 is thus being transmitted in a desired direction without a need for mechanical gimbals. This desired direction is capable of covering a large angular range with respect to the optical axis 24.

In a second broad aspect, the optical beam steering system 10 operates as a receiver. The small angle beam steerer 16 receives a collimated laser beam 22 and redirects the collimated laser beam through a small angular deviation, $\Delta_2$. The optics system 12 focuses the redirected laser beam 20 onto the focal plane 18. In this broad aspect, a plurality of detector elements 14 are positioned on the focal plane 18. Each detector element 14 is capable of receiving the focused laser beam from a desired direction without a need for mechanical gimbals. The desired direction is capable of covering a large angular range with respect to said optical axis.

Figure 2:
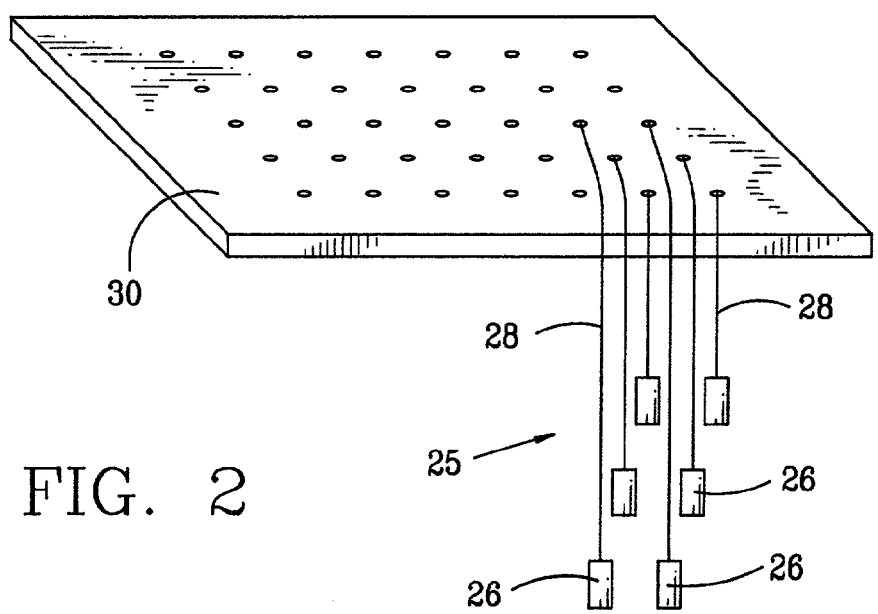
FIG. 2 is a schematic illustration showing the use of laser diodes and optical fibers used as source elements so that the optical beam steering system operates as a transmitter.

Referring now to FIG. 2, an embodiment of source elements is illustrated in which these source elements comprise a 2-dimensional optical fiber array, designated generally as 25. The optical fiber array 25 comprises a plurality of laser diodes 26 in conjunction with optical fibers 28. A perforated metal or ceramic plate 30 is used to support the end of each optical fiber 28. Conventional telecom laser diodes of up to 1 watt (typically about 10-100 mW) such as manufactured by Nortel or Alcatel may be used. The optical fibers may be of the single mode type. Use of this type of source element provides a high power implementation of the optical beam steering system being implemented as a transmitter.

Figure 3:
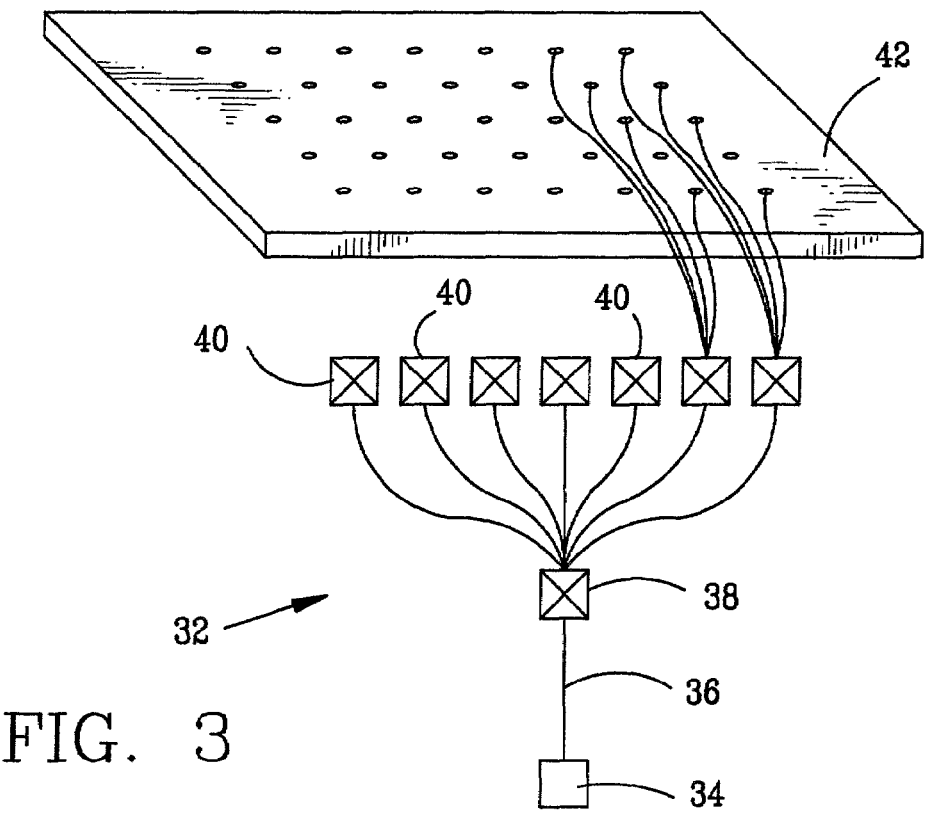
FIG. 3 is a schematic illustration showing the use of an optical switching network, the optical beam steering system operating as a transmitter.

Referring now to FIG. 3, an embodiment is illustrated in which the source elements comprise an optical switching network, designated generally as 32. The switching network 32 illustrated is shown by way of illustration and not limitation. A single laser diode is connected via an optical fiber 36 to an optical switching device 38. Device 38 is, in turn, connected to a plurality of optical switching devices 40 that have optical fibers supported on the focal plane 42, as described above. The optical switching devices 38,40 may be, for example, binary waveguide devices, such as 1×2 lithium niobate electro-optic devices; 1×N lithium niobate electro-optic devices; 1×N MEMS devices, such as manufactured by Lucent technologies; or, 1×N mechanical switches such as used in the telephone fiber industry.

Figure 4:
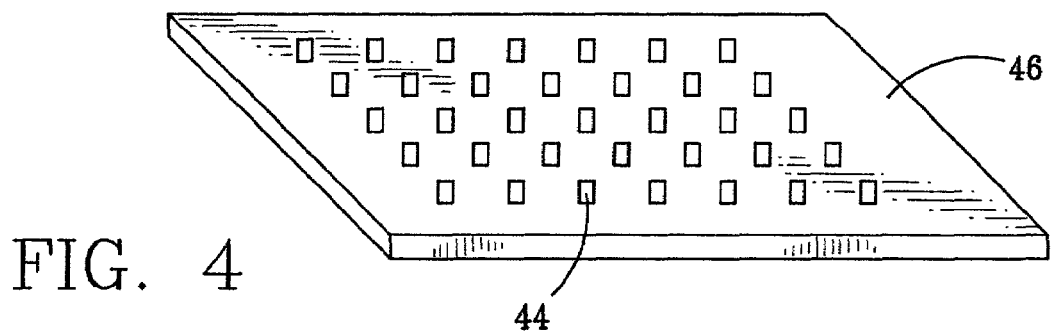
FIG. 4 is a schematic illustration showing the use of vertical cavity surface emitting lasers (VCSEL's) as source elements, the optical beam steering system operating as a transmitter.

Referring now to FIG. 4, an embodiment is illustrated in which vertical cavity surface emitting lasers (VCSEL's) 44 are positioned on a focal plane 46 and are utilized as source elements for the optical beam steering system being implemented as a transmitter. Such VCSEL's 44 are manufactured by, for example, Honeywell.

Figure 5:
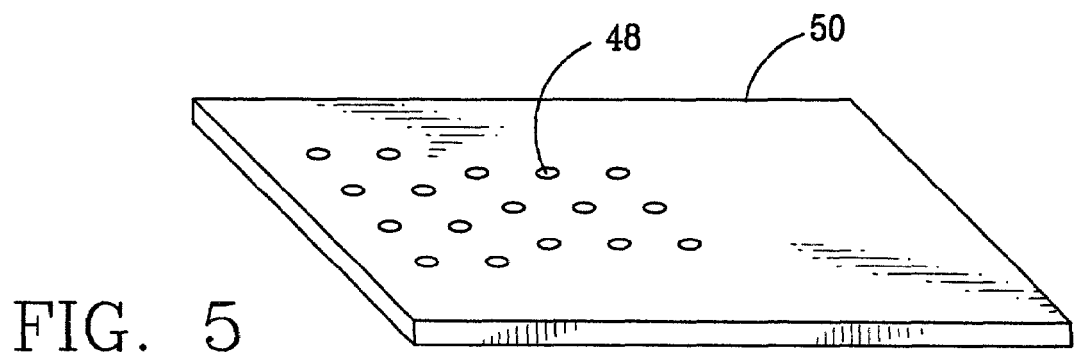
FIG. 5 is a schematic illustration showing the use of detector elements on the focal plane so that the optical beam steering system operates as a receiver.

Referring now to FIG. 5, a plurality of detectors 48 are positioned on a focal plane 50 so that the optical beam steering system is implemented as a receiver. The detectors 48 may be, for example, PIN's or APD's or other standard telecom detectors manufactured, for example, by Nortel or Alcatel.

Utilization of the present invention as a transmitter will be illustrated in the following example. Suppose a 20 mm focal length optical element is selected. Then, to cover a 90×90 degree field of regard, the sources will have to span 40×40 mm area in the focal plane. If the small angle steering device can steer through 5 degrees, then 18×18 point sources in the focal plane will be required to fully cover the field of regard. This focal plane can be assembled using individual VCSEL chips mounted on a circuit board utilizing automated electronics assembly equipment. The fine steering system is fabricated using commercial techniques developed for liquid crystal displays. Thus, a large angle beam steering system can be built without precision mechanical gimbals.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

The invention claimed is:

1. An optical beam steering system transmitter comprising:
   a focal plane having a plurality of source elements thereon;
   an optics system receiving light from a selected one of the source elements and providing an output beam, a large steering angle of the output beam being defined by a position of the source element that was selected; and
   a small angle beam steerer receiving the output beam and determining a small steering angle of the output beam.

2. The optical beam steering system transmitter as recited in claim 1, wherein the output beam from the optics system is collimated.

3. The optical beam steering system transmitter as recited in claim 1, wherein the small angle beam steerer is capable of steering in a range of about 0 to 5 degrees.

4. The optical beam steering system transmitter as recited in claim 1, wherein the small angle beam steerer comprises an optical phased array.

5. The optical beam steering system transmitter as recited in claim 1, wherein the optics system comprises a wide angle lens.

6. The optical beam steering system transmitter as recited in claim 1, wherein the optics system is positioned generally between the focal plane and the small angle beam steerer and is spaced from the source elements.

7. The optical beam steering system transmitter as recited in claim 1, wherein the small angel beam steerer comprises an acousto-optic device.

8. The optical beam steering system transmitter as recited in claim 1, wherein the source elements comprise an optical switching network and further comprising a plurality of optical switch devices.

9. An optical beam steering system receiver comprising:
a focal plane having a plurality of detector elements thereon;
a small angle beam steerer receiving light and determining a small steering angle of the light so as to direct an output beam toward one of the detector elements; and
an optics system positioned between the focal plane and the small angle beam steerer, the optics system receiving light from the small angle beam steerer and providing the output beam, the output beam being directed toward one of the detector elements according to a large steering angle defined by an angle of the light received by the optics system.

10. The optical beam steering system receiver as recited in claim 9, wherein the input light to the optics system is collimated.

11. The optical beam steering system receiver as recited in claim 9, wherein the small angle beam steerer is capable of steering in a range of about 0 to 5 degrees.

12. The optical beam steering system receiver as recited in claim 9, wherein the small angle beam steerer comprises an optical phased array.

13. The optical beam steering system receiver as recited in claim 9, wherein the optics system comprises a wide angle lens.

14. The optical beam steering system receiver as recited in claim 9, wherein the plurality of detector elements comprise PIN's.

15. The optical beam steering system receiver as recited in claim 9, wherein the plurality of detector elements comprise APD's.

* * * * *